United States Patent [19]

Graves et al.

[11] 4,265,696

[45] May 5, 1981

[54] APPARATUS FOR HEAT SEALING

[75] Inventors: Daniel G. Graves; Vernard L. Graves, both of Duncanville; Ernest W. Knudsen, Jr., Arlington, all of Tex.

[73] Assignee: Universal Precision Machining Co., Dallas, Tex.

[21] Appl. No.: 72,648

[22] Filed: Sep. 5, 1979

[51] Int. Cl.³ .................. B65B 7/14; B65B 51/14; B65B 51/16; B65B 51/30
[52] U.S. Cl. .................... 156/443; 53/373; 53/479; 53/481; 156/499; 156/538; 156/539; 156/579
[58] Field of Search ............... 156/499, 538, 579, 580, 156/583.1, 583.9, 583.91, 515, 443; 53/479, 481, 373; 93/44.1 GT

[56] References Cited
U.S. PATENT DOCUMENTS

| | | | |
|---|---|---|---|
| 2,691,474 | 10/1954 | Olson | 156/499 |
| 2,911,778 | 11/1959 | Ozor | 53/481 |
| 3,017,314 | 1/1962 | Kebekus et al. | 156/515 |
| 3,063,890 | 11/1962 | Saumsiegle | 53/373 |
| 3,162,564 | 12/1964 | Buchner | 156/583.9 |
| 3,196,068 | 7/1965 | Schoder et al. | 156/583.9 |
| 3,330,716 | 7/1967 | Zelnick | 156/499 |

Primary Examiner—Jerome W. Massie
Attorney, Agent, or Firm—Stanley R. Moore; Thomas L. Crisman

[57] ABSTRACT

Apparatus is provided for sealing heat sealable material with a single actuation drive train. The drive train comprises a series of gripping, heating and squeezing elements directly actuatable and sequentially staged in conjunction with eccentric linkages and the rotational position of a single drive shaft operable by a single handle and/or input source. In a manual mode the second hand of the operator is thus free to collect and position the material to be sealed, saving time and reducing operator error. The gripping and squeezing elements and their operation are also selectively programmable by the construction and orientation of the particular eccentric linkage to facilitate wide variations in the scope of sealing applications.

14 Claims, 7 Drawing Figures

APPARATUS FOR HEAT SEALING

BACKGROUND OF THE INVENTION

The present invention refers to sealing apparatus and, more particularly, to the heat sealing of thermoplastic tubular members such as collapsible dispensing tubes.

Conventional dispensing tubes in toothpaste and the like are commonly made of plastic materials. The preparations are usually injected into the tubes through an unseated end opposite that of the dispensing region which is often tapered to a narrow diameter and capped. After the tube has been filled, the end through which the filling took place must be closed and sealed to prevent the contents from leaking out. This is particularly a problem with more viscous pastes in that the considerable pressure applied to the tube to extrude it through the capped end also bears against the sealed end. Although the formation of solid joints is no longer a technical problem with the advent of improved thermoplastic resins and polyethylene synthetic resins, the manner and efficiency in which such joints are formed is an ever present consideration. For example, certain materials such as polyethylene cannot be sealed by the direct application of hot sealing elements or sticking is the result. Therefore, prior art technology has produced radiant heater-squeezing assemblies which effectively form leak-tight seals across tubular orifices and related open material plies.

The methods and apparatus for forming seals in thermoplastic materials have been well defined by prior art patents. For example, U.S. Pat. No. 2,691,474 to Olson discloses a thermoplastic sealing structure. The Olson apparatus teaches the uniting of polyethylene plies with radiant heat and subsequent squeezing until the material sets. A manually operable machine is likewise disclosed incorporating means for clamping the material to be sealed in one step, providing means for heating the heating element and subsequently lowering it to close proximity with the plastic to be sealed. The operator then rotates separate handles after releasing the heating element to press the molten plastic into a seal. Other such prior art methods and apparatus known to the inventor hereof are as follows:

| U.S. PAT. NO. | DATE ISSUED | INVENTOR |
| --- | --- | --- |
| 2,928,216 | 3/15/60 | R. Orsini |
| 2,524,584 | 10/03/50 | W. J. Zehr |
| 2,987,858 | 6/13/61 | W. C. Kerker |
| 3,333,391 | 8/01/67 | J. M. Horeth et al |
| 4,019,305 | 4/26/77 | Russell P. McGhie et al |

As the above references reflect, the formation of a leak-tight seals in plastic tube containers is of utmost importance for obvious sanitary and commercial reasons. Likewise, performance consistency is critical and it is made no more apparent than in the smaller "manual" tube sealing operations. The forming of a "good" joint in heat sealable plastic depends upon such factors as heat intensity, heat duration, and the equally important collateral aspects of alignment, positioning and the "squeeze" time of the heated molten plastic. Such parameters are not easy to maintain with most conventional apparatus, particularly where the operator must actuate a plurality of handles and/or tie up both hands in performing the required operations.

It is a purpose of the present invention to overcome the disadvantage of the prior art methods and apparatus by providing a system utilizing a single drive train for "programmed" control of the sealing stages even with manual actuation. The methods and apparatus as disclosed herein provide a radiant heating element which is constantly on at a preselected temperature and engageable with the material to be sealed only through a sequentially staged progression necessitating only one hand of the operator. In this manner, the operator has one hand free to handle product and concentrate on performance accuracy with few of the associated problems of earlier methods of multi-operational stage procedures. In addition, the incorporation of semi-automated operation is made feasible with a system depending substantially on single rotational speed consistency as its main quality control consideration.

SUMMARY OF THE INVENTION

The invention relates to the sealing of heat sealable material, and more particularly, to apparatus for manually sealing heat sealable material in a manner requiring the use of only one of the two hands of an operator by incorporating a single actuation drive train to sequentially grip, heat and squeeze heat sealable material positioned therein. The apparatus comprises a drive shaft connected to an actuation handle rotationally responsive to arcuate motion. A heat sealing element is coupled to the drive shaft for movement in response to rotation of the drive shaft and the heating of material disposed upon an associated support frame. First and second gripping jaws are pivotally mounted to the support frame through a first cam linkage secured upon the drive shaft adjacent the gripping jaws for cammed actuation, separation and engagement of the gripping jaws in response to rotation of the drive shaft. The gripping jaws are biased against the first cam linkage by a spring or the like. First and second squeezing jaws are disposed between the gripping jaws and the heat sealing element and pivotally mounted to the support frame through a second cam linkage secured upon the drive shaft adjacent the squeezing jaws for cammed actuation, separation and engagement of the squeezing jaws also in response to rotation of said drive shaft. The squeezing jaws are biased against the second cam linkage. The first and second cam linkages are connected to the drive shaft relative to the heat sealing element for sequential actuation of the gripping jaws and the squeezing jaws relative to the rotation of the drive shaft by the handle and the positioning of the heating element relative to the material to be sealed. The operator thus needs but one hand to operate the assembly and has to make few operational decisions as compared to conventional apparatus.

In another aspect the invention includes a method for manually sealing heat sealable material by gripping, heating and sealing said material in a single actuation bi-directional drive train and in a manner requiring the use of only one hand of an operator. The method comprises providing a manually operable drive shaft rotatably mounted within a support frame and a heat sealing element for sealing said material. The heat sealing element is directly coupled to the drive shaft for rotation therewith. Means are provided for gripping the material relative to a first rotatable position of said drive shaft and for squeezing the material relative to a third rotatable position of said drive shaft. The material is then disposed adjacent the drive train with the drive shaft in an initial open, rotatable position. The drive shaft is rotated in a first direction to a first position of arcuate displacement to grip the material relative to the drive shaft. Next, the drive shaft is rotated to a second position of greater arcuate displacement and wherein the heat sealing element is adjacent the material. The drive shaft is then rotated in a second, opposite direction to a third position between the first and second positions wherein the heat sealing element is displaced from the material and the heated material squeezed to form a seal. When the drive shaft is rotated back in to its initial rotational position the sealed material may be removed and new material inserted. Such methods and apparatus are particularly applicable to open ended, thermoplastic dispensing tubes.

BRIEF DESCRIPTION OF THE DRAWINGS

For a more complete understanding of the present invention, and for further objects and advantages thereof, reference may be now had to the following description taken in conjunction with the accompanying drawings in which.

DETAILED DESCRIPTION OF THE DRAWINGS

Figure 1:
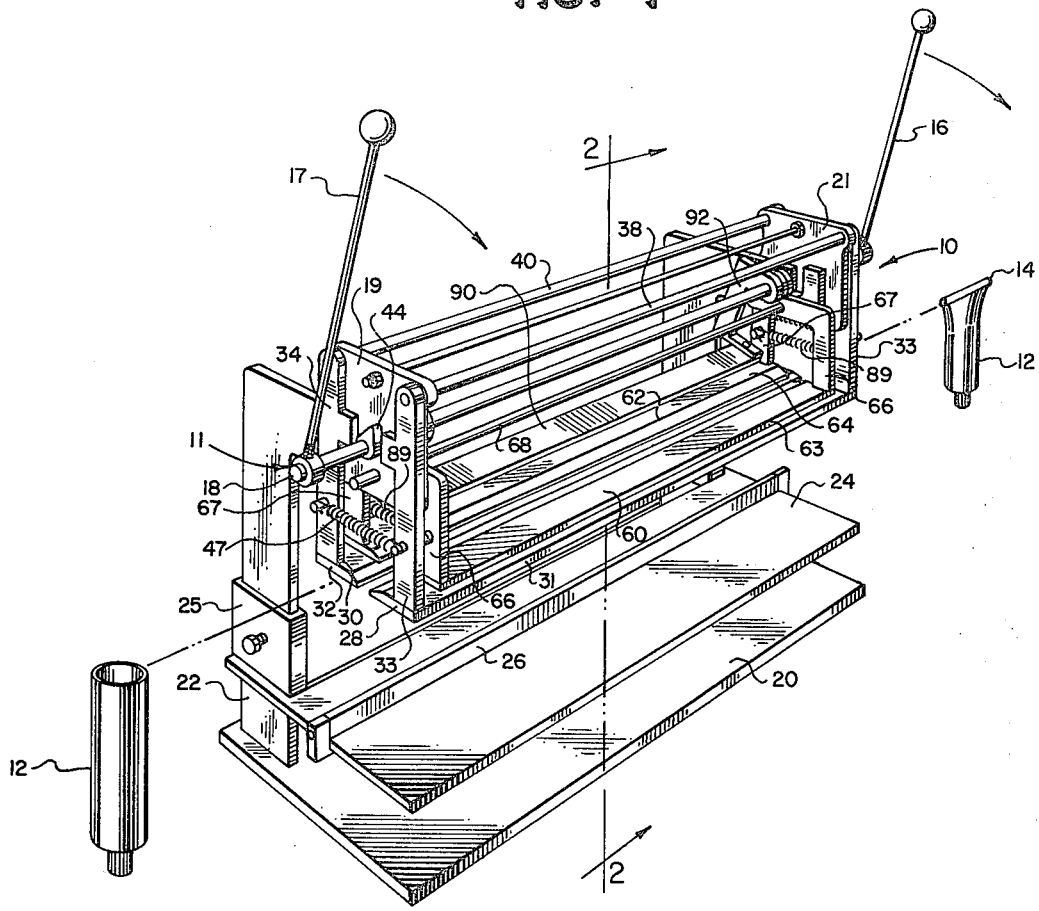
FIG. 1 is a perspective view of one embodiment of the apparatus constructed in accordance with the principles of the present invention.

Referring first to FIG. 1, there is shown a perspective view of one embodiment of the apparatus of the present invention. A heat sealing unit 10 includes a drive train or system 11 for engaging open ended tubular members 12 formed of conventional heat sealable material such as plastic and producing a sealed joint 14 as diagrammatically illustrated. The system 11 includes a first handle 16 connected to a drive shaft 18 rotatably mounted through opposite side frame walls 19 and 21 of the system 11. The system 11 is supported and positioned by a pair of side frames 22 affixed to and/or integral with said side frame walls 19 and 21. Side frames 22 each upstand from a support base 20. An adjustable platform 24 is slidably secured to said side frames 22 by fastening members 25 engaging said side frames. A moveable product alignment rib 26 extends across the platform 24 in generally parallel alignment with said shaft 18 for facilitating accurate positioning of tubular members 12 to be sealed.

Still referring to FIG. 1 the system 11 includes first and second gripping jaws 28 and 30 extending across the unit 10 in generally parallel spaced relationship with the shaft 18. The gripping jaws 28 and 30 are comprised of elongated gripping bars 31 and 32, respectively, and pairs of gripping bar connecting arms 33 and 34, respectively, supporting said gripping bars at opposite ends. The connecting arms 33 are each pivotally mounted to the opposite side frame walls 19 and 21 in support of gripping bar 31. Likewise, the connecting arms 34 are each pivotally mounted to the opposite side frame walls 19 and 21 in support of gripping bar 32. In this particular embodiment the connecting arms 33 and 34 are pivotally mounted by gripping bar support shafts 38 and 40, respectively, which extend through side frame walls 19 and 21. Each paired set of gripping bar connecting arms 33 and 34 are responsive to rotation of the shaft 18 through a first cam linkage comprising eccentric members 44 and 45 secured to the shaft 18 adjacent said gripping bar connecting arms. Eccentric member 44 is disposed outwardly of side frame wall 19 between said gripping bar connecting arms 33 and 34. Likewise, an eccentric member 45 (hidden from view in this figure but shown in FIG. 3) is disposed between said gripping bar connecting arms 33 and 34 outwardly of side frame wall 21. A spring 47 is provided between each pair of gripping bar connecting arms 33 and 34 to bias said arms one toward the other and toward the eccentric members 44 and 45.

Figure 3:
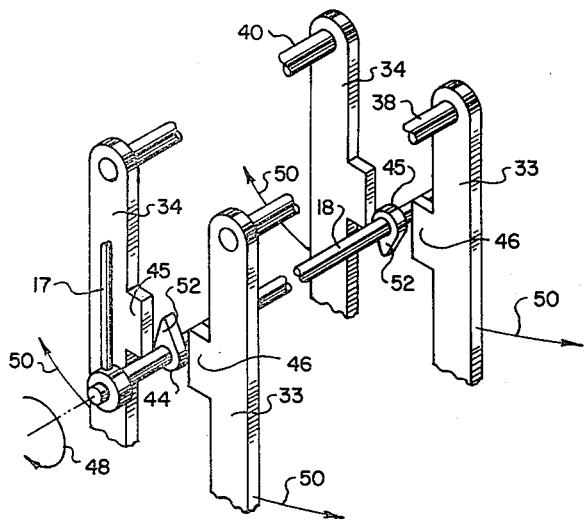
FIG. 3 is an enlarged fragmentary view of the particular linkage system of the apparatus of FIG. 1 providing for gripping of the material to be sealed.

Referring now to FIG. 3, the gripping jaw assembly above described is shown in isolation for purposes of clarity. It may be seen that each gripping bar connecting arm 33 and 34 includes a laterally disposed shoulder portion 46 for abutting the eccentric member positioned adjacent thereto. Rotation of the shaft 18 in the direction of arrow 48 thus causes the gripping bar connecting arms to move outwardly as indicated by the arrows 50, when the eccentrics 44 and 45 are in the position shown in FIG. 3. It may also be seen that eccentric 44 is oppositely disposed upon shaft 18 relative to the "tear drop" shaped eccentricity region 52 of each eccentric for facilitating the necessary sequencing of the gripping operation of this particular embodiment. By oppositely disposing said tear drop region 52, eccentric 44 will engage the gripping bar connecting arm 33 adjacent side frame wall 19 causing both arms 33 and the gripping 31 therebetween to rotate outwardly while eccentric 45 provides the complemental arcuate motion to arms 34 and gripping bar 32.

Referring again to FIG. 1, there is shown the structure of first and second squeezing jaws 60 and 62 comprising another element of the system 11 of the present invention. The squeezing jaws 60 and 62 extend across the unit 10 in generally parallel spaced relationship with the shaft 18 and are comprised of elongated squeeze bars 63 and 64, respectively, and pairs of squeeze bar connecting arms 66 and 67, respectively. The squeeze bar containing arms support said squeeze bars at opposite ends. The connecting arms 66 are each pivotally mounted to the opposite side frame walls 19 and 21 in support of squeeze bar 63. Likewise the connecting arms 67 are each pivotally mounted to the opposite side frame walls 19 and 21 in support of squeeze bar 64. Spring members 89 connect each pair of connecting arms 66 and 67 and bias said squeeze bars 63 and 64 one toward the other and about shaft 18. In this particular embodiment the connecting arms 66 and 67 are pivotally mounted by a single squeeze bar support shaft 68 which extends through side frame walls 19 and 21. Each paired set of squeeze bar connecting arms 66 and 67 are responsive to rotation of the shaft 18 for complemental actuation in system 11 as described below.

Figure 4:
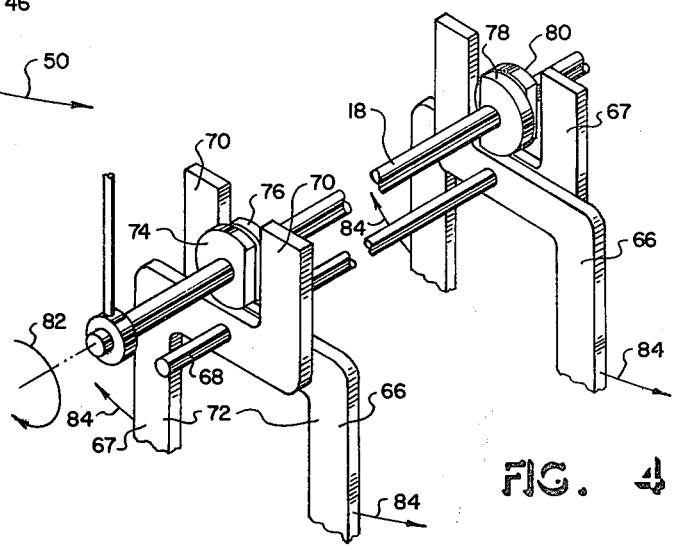
FIG. 4 is an enlarged fragmentary view of the particular linkage system of the apparatus of FIG. 1 providing for squeezing of the material to be sealed.

Referring now to FIG. 4, the squeeze bar assembly above described is shown in isolation for purposes of clarity. It may be seen that each squeeze bar connecting arm 66 and 67 includes an orthogonal Z construction having first and second linkage struts 70 and 72, respectively, in generally parallel relationship and joined by an orthogonal pivot leg 73 mounted to the shaft 68. Each paired set of arms 66 and 67 are mounted in reverse, coaxial relationship, as shown, wherein the upper struts 70 are disposed about a series of eccentric members affixed to shaft 18 comprising a second cam linkage system. As shown in FIG. 4, an eccentric 74 abuts strut 70 of an arm 67, eccentric 76 abuts strut 70 of an arm 66, eccentric 78 abuts strut 70 of an arm of an arm 66, and eccentric 80 abuts strut 70 of an arm 67. Rotation of the shaft 18 in the direction of arrow 82 thus causes the squeeze bar connecting arms to move outwardly as indicated by the arrows 84 as shown.

Referring once more to FIG. 1, there is shown a heat sealing element 90 secured at opposite ends by heat element support arms 92 affixed the shaft 18 for rotation therewith. The heat element 90 is of conventional design and may be heated electrically in a conventional manner (not shown for purposes of clarity) to a constant temperature. Since the heat element 90 is positionally responsive directly to the rotational position of the shaft 18 a separate heat control is not necessary relative to its operation. The element 90 is simply rotated out of the way when not in use. This aspect of the present invention provides many advantages in that the heating stage of operation can only be effected in conjunction with the proper sequencing of the squeezing and gripping operations. For example, referring to FIG. 2, the heating element 90 is illustrated as retracting in direction of arrow 94 in response to movement of handle 16 in the direction of arrow 96. The presence of heating element 90 directly above a suitable tube 12 held by gripping jaws 28 and 30 causes end 93 of said tube to melt in preparation for engagement by squeezing jaws 60 and 62, shown moving to a squeeze position by arrows 97 and 98. The opposite movements of jaws 60 and 62 and element 94 via the single directional rotation of drive shaft 18 by handle 16 is provided by the cammed linkage above discussed and is one of the advantageous aspects of the operation of the present invention.

In operation, the unit 10 is supplied with conventional power such as electricity for bringing the heating element 90 to the desired temperature. A water supply (not shown) is also preferably provided for cooling the gripping jaws 28 and 30 and squeezing jaws 60 and 62. The water supply lines (not shown) are generally connected directly to the gripping bars 31 and 32 and to the squeezing bars 63 and 64 for passage through the bars and the removal of residual heat collected from engaging the heat sealed portions of the tubes 12. In this manner, the molten plastic of said tubes harden quicker with little surface adherence or sticking to said bars.

Figure 5:
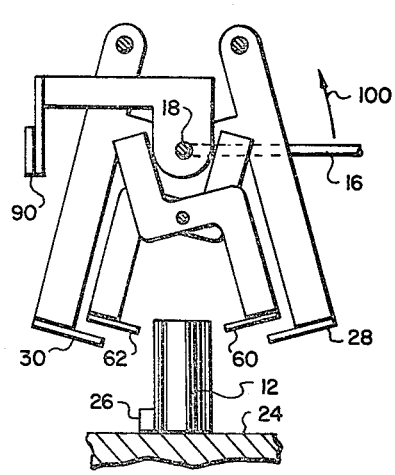
FIG. 5 is an enlarged, fragmentary, side elevational view of the drive train linkage of the apparatus of FIG. 1 illustrating the first stage of operation and the placement of material to be sealed therein.

Referring now to FIGS. 5 through 7, and 2 in combination, four stages of the sealing sequence are shown for illustrating further both the method and apparatus of the present invention. In FIG. 5, the tube 12 is positioned upon platform 12 against rib 26, said platform and rib having been adjunctably positioned for the particular size of said tube. It should be noted that in production operations a holding fixture (not shown) is usually incorporated to position a plurality of tubes 12 at one time. The jaws of FIG. 5 are of course, all open and the heating element 90 fully retracted as handle 16 lies in an open, ready position for initiating movement in the direction of arrow 100. It should be noted that handle and jaw positions are shown for purposes of illustration only and may be selectively set in conjunction with the first and second cam linkages disclosed herein for varying the rotational parameters, assembly stage, sequencing, and associated time intervals for each operation segment. In addition, a second handle 17, shown in FIG. 1, is optionally provided for left hand operators. Since only one hand is needed the operator has considerably more freedom to use the other hand to position material or perform associated functions.

Figure 2:
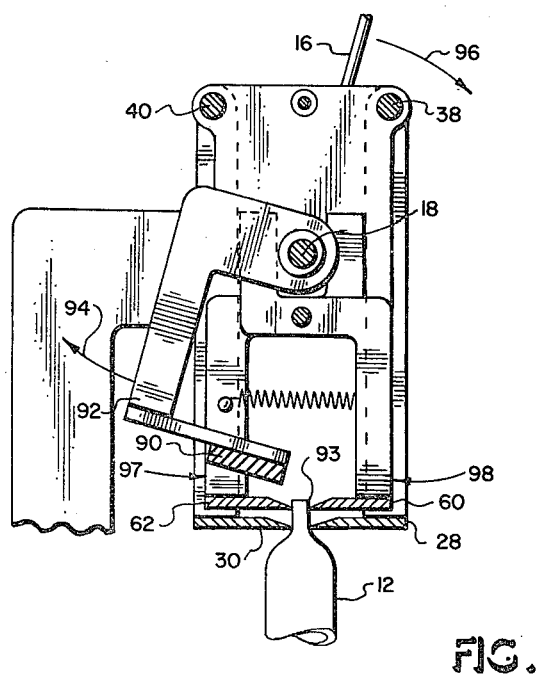
FIG. 2 is an enlarged fragmentary side elevational view of the apparatus of FIG. 1 taken along the lines 2—2 thereof and illustrating one phase of the operation of the sequentially staged linkage.
Figure 6:
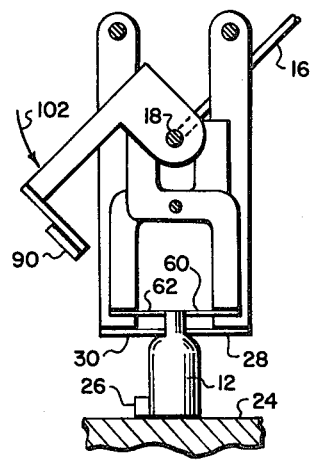
FIG. 6 is a view of a second stage of operation of the drive train linkage shown in FIG. 5.
Figure 7:
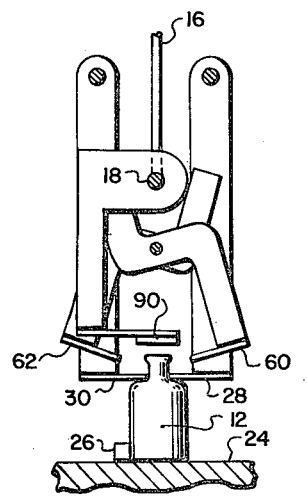
FIG. 7 is a view of a third stage of operation of the drive train linkage shown in FIG. 5 for further illustrating one embodiment of the method and apparatus of the present invention.

Referring now to FIG. 6, the handle 16 has moved to an upper position of arcuate displacement and the heating element 90 has been moved in the direction of arrow 102. This rotational position of shaft 18 has actuated the first and second cam linkages above described to close the gripping and sealing jaws as shown. In FIG. 7, the handle 16 has been rotated to a position wherein the heating element is directly over the tube 12 for radiant heating of the plastic material thereof into a molten state. The squeezing jaws 60 and 62 are thus retracted. In FIG. 2, the handle 16 is rotated in the opposite, return direction 96 causing the squeezing jaws 60 and 62 to squeeze molten section 63 until both the squeezing jaws and the gripping jaws open to release the sealed tube 14. As described, this method and apparatus substantially alleviates most potential operator error and maximizes time and efficiency in the sealing operation.

It is thus believed that the operation and construction of the present invention will be apparent from the foregoing description. While the apparatus as shown and described has been characterized as being preferred it will be obvious that various changes and modifications may be made therein without departing from the spirit and scope of the invention as defined in the following claims.

What is claimed:

1. Apparatus for manually sealing heat sealable material in a manner requiring the use of only one of the two hands of an operator by incorporating a single actuation drive train to sequentially grip, heat and squeeze heat sealable material positioned therein, said apparatus comprising:

at least one actuation handle for manual engagement by an operator and select arcuate motion;

a drive shaft connected to said handle at one end and rotationally responsive to arcuate motion of said handle;

a support frame supporting said drive shaft for rotational movement;

a heat sealing element coupled to said drive shaft for movement in response to rotation of said drive shaft and the heating of material disposed adjacent thereto;

first and second gripping jaws pivotally mounted to said support frame;

first cam linkage secured upon said drive shaft adjacent said gripping jaws for cammed actuation, separation and engagement of said gripping jaws in response to rotation of said drive shaft;

means biasing said gripping jaws against said first cam linkage;

first and second squeezing jaws disposed between said gripping jaws and said heat sealing element and pivotally mounted to said support frame;

second cam linkage secured upon said drive shaft adjacent said squeezing jaws for cammed actuation, separation and engagement of said squeezing jaws in response to rotation of said drive shaft;

means biasing said squeezing jaws adjacent said second cam linkage;

means for supporting said material to be sealed between said support jaws and said gripping jaws; and said first and second cam linkages being connected to said drive shaft relative to said heat sealing element for sequential actuation of said gripping jaws and said squeezing jaws relative to the rotation of said drive shaft by said handle and the positioning of said heating element relative to said material to be sealed.

2. Apparatus as set forth in claim 1 wherein said first and second squeezing jaws each includes at least one squeeze connecting arm, a squeeze bar affixed said squeeze connecting arm, and means for pivotally mounting said squeeze connecting arm to said support frame.

3. Apparatus as set forth in claim 2 wherein said means for pivotally mounting said squeeze connecting arm includes a squeeze support shaft mounted to said support frame and said squeeze connecting arm for rotational movement thereof.

4. Apparatus as set forth in claim 3 wherein said first squeeze connecting jaw includes a squeeze bar pivotally connected to said support frame at opposite ends of said squeeze bar by first squeeze connecting arms and said second squeeze connecting jaw includes a squeeze bar pivotally connected to said support frame at opposite ends of said squeeze bar by second squeeze connecting arms.

5. Apparatus as set forth in claim 4 wherein said first and second squeeze connecting arms each comprise an orthogonal Z construction having first and second linkage struts in generally parallel spaced relationship and joined by an orthogonal pivot leg.

6. Apparatus as set forth in claim 5 wherein said first and second squeeze connecting arms are mounted in reverse, coaxial positioning upon said squeeze support shaft, wherein said first linkage strut of each of said squeeze connecting arms is disposed adjacent said drive shaft and on opposite sides thereof and said second linkage strut depends therebeneath in securement of said squeeze bar.

7. Apparatus as set forth in claim 6 wherein said second cammed linkage comprises at least one eccentric member secured upon said drive shaft in mating engagement with said first linkage struts of said first and second squeeze connecting arms.

8. Apparatus as set forth in claim 6 wherein said means biasing said squeeze connecting arms comprises a spring member connected between said second linkage struts of said first and second squeeze connecting arms biasing said first linkage struts thereof toward first and second eccentric members.

9. Apparatus as set forth in claim 1 wherein said first and second gripping jaws each comprise an elongated gripping bar, gripping bar connecting arms affixed to said gripping bars at opposite ends thereof, and means for pivotally mounting said gripping bar connecting arms to said support frame.

10. Apparatus as set forth in claim 9 wherein said means for mounting said gripping bar connecting arms to said support frame includes at least one gripping bar support shaft mounted in said support frame.

11. Apparatus as set forth in claim 10 wherein said first cammed linkage comprises at least one eccentric member secured upon said drive shaft in mating engagement with said gripping bar connecting arms for imparting pivotal motion to said gripping bar connecting arms about said gripping bar support shaft in response to rotation of said drive shaft.

12. Apparatus as set forth in claim 11 wherein said second cammed linkage includes at least one eccentric member secured upon said drive shaft with sufficient eccentricity to separate said first and second supporting jaws from said material to be sealed when said sealing element is positioned adjacent said material for the heating thereof and when said gripping jaws are themselves separated one from the other for the positioning and removal of material therebetween.

13. Apparatus as set forth in claim 1 wherein said drive shaft includes a second handle disposed at a second opposite end of said shaft for permitting the operator to use either of the two hands.

14. Apparatus as set forth in claim 1 wherein said heat sealing element is affixed to said drive shaft for arcuate movement in response to rotation of said drive shaft.

* * * * *